(12) United States Patent
Norton et al.

(10) Patent No.: US 6,264,007 B1
(45) Date of Patent: Jul. 24, 2001

(54) AUTOMATIC LOCKING SYSTEM FOR WHEELCHAIRS

(75) Inventors: Don S. Norton, Clinton; Robert E. Singletary, Florence, both of MS (US); Grady A. Dugas, Marion, LA (US)

(73) Assignee: Safer Automatic Wheelchair Wheel Locks Inc., Jackson, MS (US)

( * ) Notice: Subject to any disclaimer, the term of this patent is extended or adjusted under 35 U.S.C. 154(b) by 0 days.

(21) Appl. No.: 09/442,775

(22) Filed: Nov. 18, 1999

(51) Int. Cl.[7] .................................................. B60T 1/00
(52) U.S. Cl. .............................................. 188/2 F; 188/31
(58) Field of Search ............................... 188/2 F, 31, 30, 188/17, 69, 18 R, 60, 68, 265; 280/304.1, 250.1, 642, 650, 242.1

(56) References Cited

U.S. PATENT DOCUMENTS

| | | | |
|---|---|---|---|
| 1,798,808 | * 3/1931 | Potter | 188/31 |
| 3,356,185 | * 12/1967 | Isaacks | 188/31 |
| 4,733,755 | * 3/1988 | Manning | 188/2 F |
| 5,203,433 | 4/1993 | Dugas . | |
| 5,379,866 | * 1/1995 | Pearce et al. | 188/2 F |
| 5,799,756 | * 9/1998 | Roberts et al. | 188/2 F |
| 5,984,334 | 11/1999 | Dugas . | |

* cited by examiner

Primary Examiner—Robert J. Oberleitner
Assistant Examiner—Melanie Talavera
(74) Attorney, Agent, or Firm—Nixon & Vanderhye P. C.

(57) ABSTRACT

Automatic locking systems for wheelchairs have a locking hub for attachment to a main wheel of the wheelchair, and a lock pin which is reciprocally rectilinearly moveable between locked and unlocked conditions with the lock hub. A rotary actuator is operatively coupled to the lock pin and is rotatable between normal and active positions which responsively causes the lock pin to move rectilinearly between its unlocked and locked positions, respectively. A pivotal actuator lever is provided having one end positionable in close proximity to a seat of the wheelchair. The actuator lever is thus mounted for pivotal movements between raised and lowered conditions relative to the wheelchair seat. A flexible actuator cable connects a proximal end of the actuator lever and the rotary actuator. In operation, therefore, pivotal movement of the distal end of said actuator lever between its raised and lowered conditions responsively causes the actuator cable to rotate the rotary actuator between its normal and active conditions, respectively. As a result, the lock pin is caused to move to its locked position with the lock hub to thereby lock the main wheel of the wheelchair and prevent its rolling movement across the floor surface.

18 Claims, 4 Drawing Sheets

AUTOMATIC LOCKING SYSTEM FOR WHEELCHAIRS

FIELD OF THE INVENTION

The present invention relates generally to wheelchairs. In preferred forms, the present invention is related to, and embodied in, locking mechanisms for wheelchairs, whereby the wheelchair wheels automatically lock in response to the seat of the wheelchair being vacated.

BACKGROUND AND SUMMARY OF THE INVENTION

It is oftentimes desirable for the main wheels of a wheelchair to be locked as a patient either leaves, or attempts to be seated on, the wheelchair seat. For such purpose, wheel chairs have been provided in the past with conventional hand locks which allow the main wheels of the wheelchair to be locked. However, these conventional hand locks need to be set manually in order to be effective. Users may, however, sometimes forget to set the locks prior to use which might result in a potentially dangerous situation for the user.

Recently, locking devices have been disclosed in U.S. Pat. No. 5,203,433 (the entire content of which is expressly incorporated hereinto by reference, and referred to hereinafter as "the '433 patent") whereby the wheels of a wheel chair may be locked automatically in response to the user rising from the wheelchair seat. While the automatic locking devices disclosed in the '433 patent are satisfactory for their intended purpose, some improvements are still needed. For example, certain wheelchairs especially those having multiple axle locations for the main wheels—may not readily physically accommodate the devices disclosed in the '433 patent. Thus, it would be desirable if automatic wheelchair locking devices could be provided that is universally adaptable to a wide variety of wheelchair types. It is towards providing such wheelchair locking devices that the present invention is directed.

Broadly, the present invention is embodied in wheelchair locking devices which are automatically actuated in response to weight being removed from the wheelchair seat (i.e., when the user vacates the wheelchair). In preferred forms, the present invention is embodied in automatic locking systems for a wheelchair having a locking hub for attachment to a main wheel of the wheelchair, and a lock pin which is reciprocally rectilinearly moveable between locked and unlocked conditions with the lock hub. A rotary actuator is operatively coupled to the lock pin and is rotatable between normal and active positions which responsively causes the lock pin to move rectilinearly between its unlocked and locked positions, respectively.

A pivotal actuator lever is provided having one end positionable in close proximity to a seat of the wheelchair. The actuator lever is thus mounted for pivotal movements between raised and lowered conditions relative to the wheelchair seat. A flexible actuator cable connects a proximal end of the actuator lever and the rotary actuator. In operation, therefore, pivotal movement of the distal end of said actuator lever between its raised and lowered conditions responsively causes the actuator cable to rotate the rotary actuator between its normal and active conditions, respectively. As a result, the lock pin is caused to move to its locked position with the lock hub to thereby lock the main wheel of the wheelchair and prevent its rolling movement across the floor surface.

These, and other, aspects and advantages of the present invention will become more clear after careful consideration is given to the following detailed description thereof.

BRIEF DESCRIPTION OF THE ACCOMPANYING DRAWINGS

Reference will hereinafter be made to the accompanying drawings wherein like reference numerals throughout the various FIGURES denote like structural elements, and wherein.

DETAILED DESCRIPTION OF THE INVENTION

Figure 1:
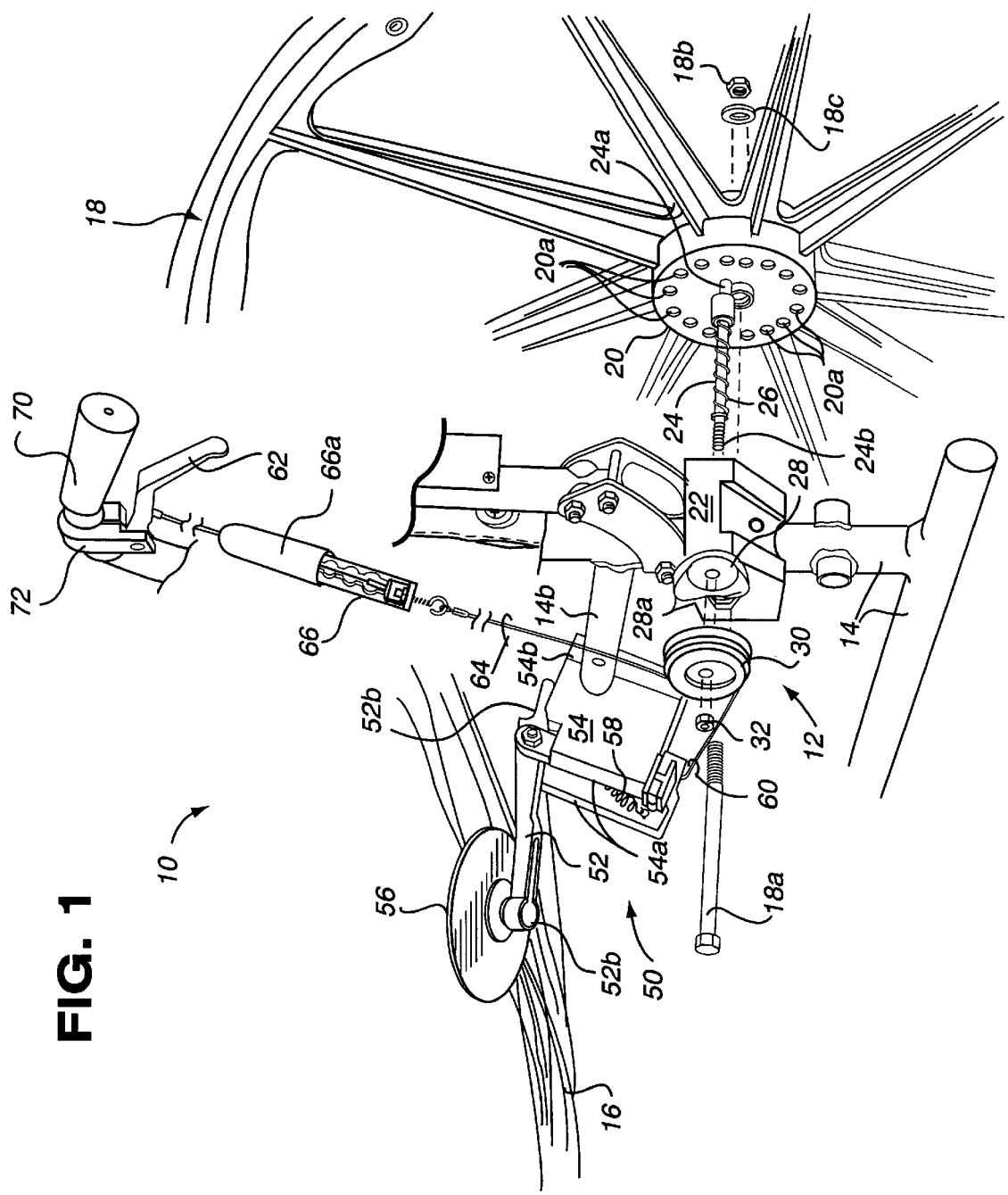
FIG. 1 is perspective view, partly exploded, of one main wheel of a wheelchair which embodies the automatic wheel locking device of the present invention as shown looking outwardly from the interior of the wheel chair.
Figure 2:
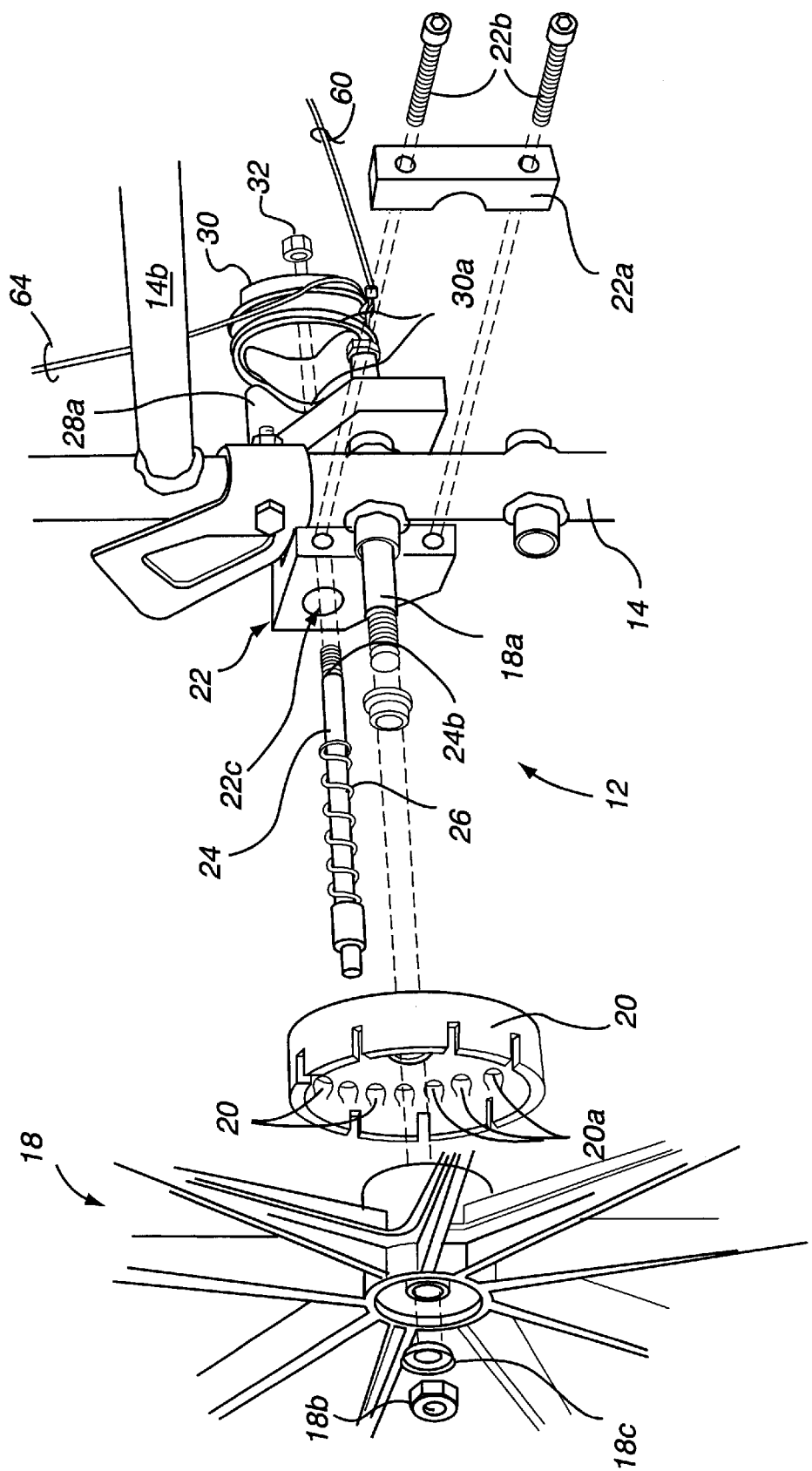
FIG. 2 is an enlarged exploded perspective view of the automatic wheel locking device of this invention as shown looking inwardly from the exterior of the wheelchair.

Only a portion of the wheelchair 10 which employs the automatic locking device of this invention 12 is shown in accompanying drawing FIGS. 1 and 2. In this regard, the wheelchair 10 is, in and of itself, conventional in that it includes a frame 14 which supports a seat portion 16 to support the weight of the user. A spoked main wheel 18 is connected journally to the frame 14 by means of wheel axle 18a and lock nut and washer 18b, 18c, respectively. A lock hub 20 is provided on the main wheel and defines circumferentially spaced-apart lock apertures (a few of which are identified by reference numeral 20a in FIGS. 1 and 2). It is, of course, to be understood that similar structures are provided with the other main wheel of the wheelchair 10, but are not shown in the drawing FIGURES for ease of description.

The locking device of the present invention includes a support block 22 rigidly coupled to an upright frame section 14a of the frame 14 near the main wheel axle 18a. As is perhaps better seen in FIGS. 2 and 3, the support block 22 is clamped to the upright frame section by means of clamp piece 22a and associated mounting bolts 22b. The support block 22 includes a through hole 22c which is in alignment with the lock apertures 20a of the lock hub 20 (see FIG. 2).

A lock pin 24 is received within the through hole 22c for reciprocal movements toward and away from the lock hub 20. In this regard, the lock pin 24 carries a torsion spring 26, the purpose of which will be described below.

The support block 22 includes a fixed cam member 28 which operatively cooperates with a rotary actuator 30, each of which being coaxially aligned with the lock pin 24. The rear terminal end 24b of the lock pin 24 is threaded and thereby rigidly fixed to the rotary actuator 30 by means of nut 32. The cam member 28 includes a pair of diametrically opposed stationary cam lobes 28a. The rotary actuator 30, on the other hand, includes a pair of diametrically opposed cam lobes 30a which are complementary to the lobes 28a of cam member 28. In a normal (locked) state, therefore, the cam member 28a will be nested within the rotary actuator 30 such that the lobes 28a, 30a are off-set by 900 relative to, and thereby intermeshed with, one another.

In use, rotation of the rotary actuator 30 will thereby cause the lobes 28a, 30a to engage one another which, in turn, displaces and horizontally separates the actuator 30 from the cam member 28. Since the rearward terminal end 24b of the lock pin 24 is fixed to the rotary actuator 30, the lock pin 24 will itself be rotated and withdrawn from the hub 20. Rotation of the lock pin 24 during such movement will load the torsion spring 26 so as to encourage the rotary actuator 30 to rotate in an opposite direction thereby returning the lock pin 24 to its locked state whereby its terminal end 24a is engaged with one of the lock apertures 20a of the lock hub 20.

Figure 4:
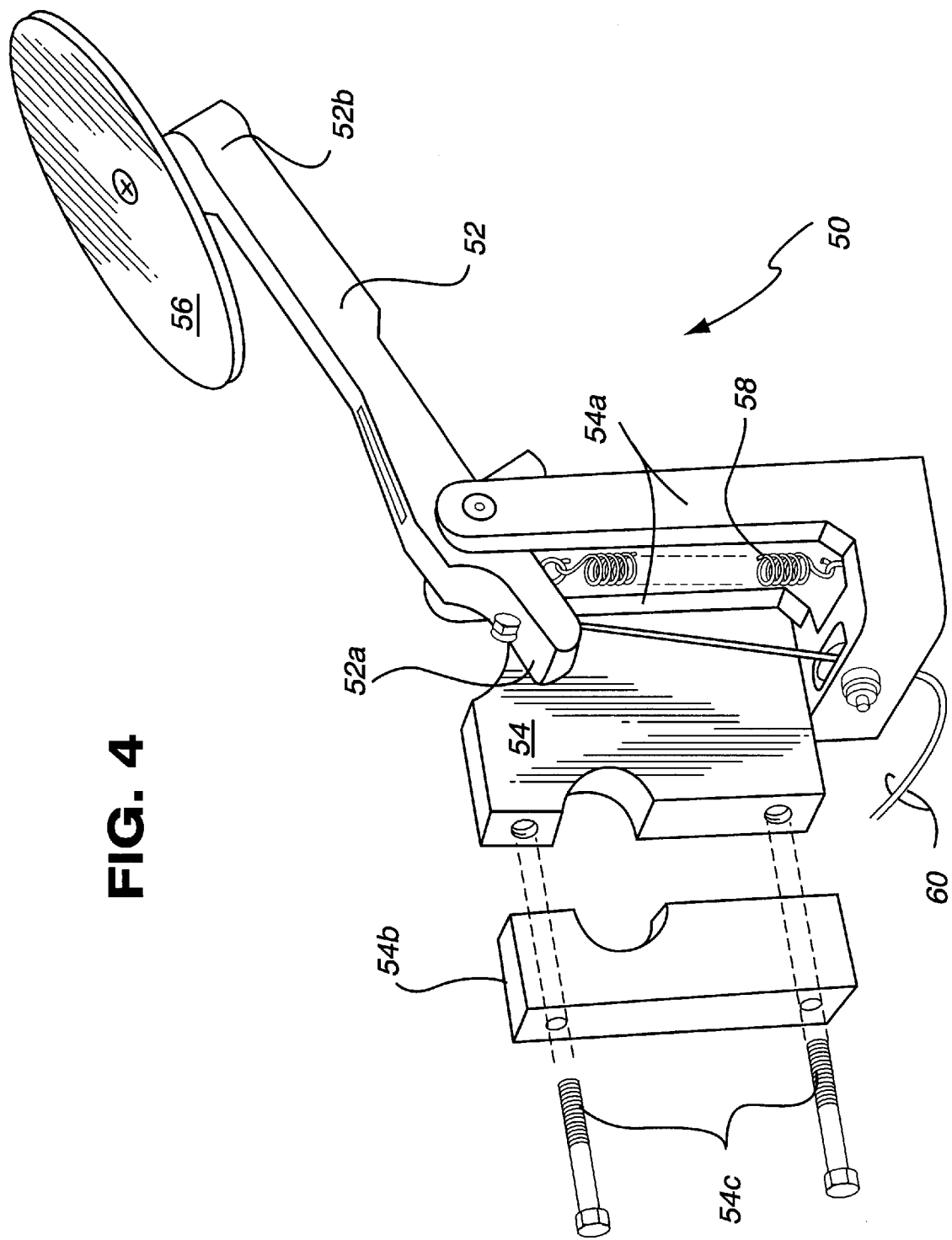
FIG. 4 is a perspective view, partly exploded, of the actuator pad arm assembly employed in the locking device of the present invention.

As shown in FIG. 4, the actuator arm 50 includes an elongate arm member 52 having a proximal end 52a thereof pivotally connected between a pair of support forks 54a associated with the actuator support block 54. The support block 54 is itself rigidly fixed to a horizontal section 14b of the wheelchair frame 14 (see FIG. 1) by means of a clamp member 54b and its associated connection bolts 54c. The distal end 52b of the arm member 52 is thus normally disposed immediately adjacent to the seat portion 16 of the wheelchair 10. The distal end 52b of the actuator arm 52 carries a transversely mounted pad member 56 which is contacted by the seat portion 16 of the wheelchair 10 when a user is seated therein. A tension spring 58 biases the actuator arm 52 in a pivotal direction which causes the actuator pad 56 to be raised into close proximity to the seat portion 16 when the device 12 of this invention is in its normal (locked) state.

Figure 3:
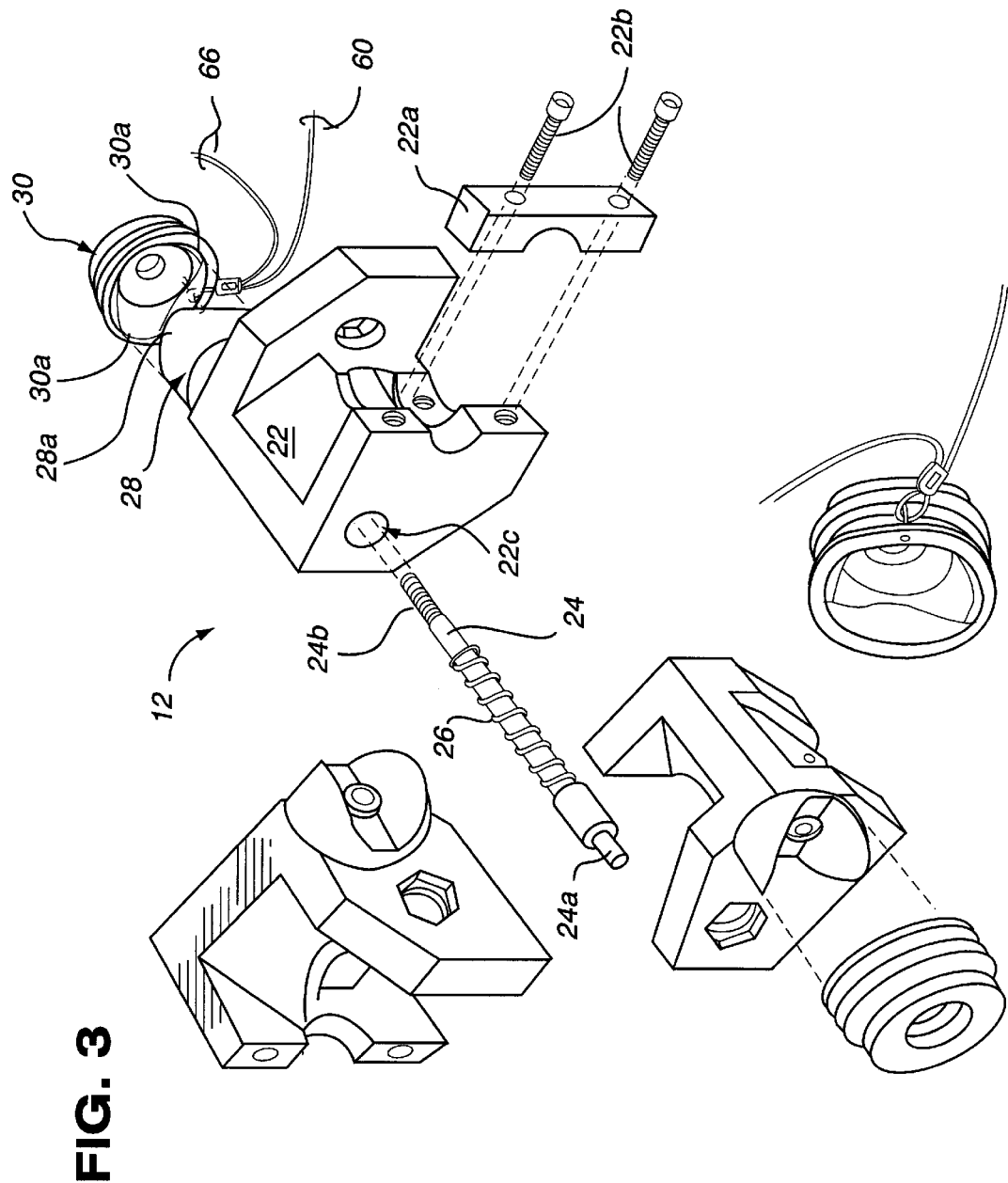
FIG. 3 is an even greater enlarged exploded perspective view of the automatic wheelchair locking device of this invention without the presence of the main wheel of the wheelchair and the wheelchair frame.

A flexible actuator cable 60 has one end fixed to the proximal end 52a of the actuator arm 52 and another end fixed to a circumferential region of the rotary actuator 30 (see FIGS. 2 and 3). The weight of a user being seated on the seat portion 16 of the wheelchair 10 will thereby bring the seat portion 16 into contact with the actuator pad 56 thereby vertically depressing the terminal end 52b of the actuator arm 52. The actuator arm 52 will thus pivot against the bias force of the tension spring 58. This movement of the actuator arm 52 will thereby responsively vertically raise its proximal end 52a thereby causing all slack in the cable 60 to be removed at which time the rotary actuator 30 is rotated. As described previously, rotation of the rotary actuator 30 will, in turn, engage the lobes 28a, 30a (i.e., cause the lobes 28a and 30a to ride on each other) and thereby laterally separate the actuator 30 from the cam member 28. As a result, the lock pin 24 is released from engagement with a registered one of the lock apertures 20a of lock hub 20.

When the weight of the user is removed from the seat portion 16, the bias force of the tension spring 58 will pivotally return the actuator arm 52 to its normal condition depicted in FIG. 4, whereby the pad 56 at the distal end 52b of the actuator arm 52 is again in a raised position, and the proximal end 52a of the actuator arm is in a lowered position. As a result, the slack in cable 60 will return thereby allowing the rotary actuator 30 to rotate in an opposite direction and once against establish the meshed relationship of the lobes 28a, 30a.

Rotation of the rotary actuator 30 to its normal condition is encouraged by the torsion spring 26. That is, with slack in the cable 60 established, the force of the torsion spring 26 is sufficient to drive the rotary actuator to its normal condition. As noted previously, this movement of the rotary actuator 30 will responsively cause the terminal end 24a of lock pin 24 to be engaged with a registered one of the lock apertures 20a of hub 20, whereby the wheel 18 of the wheelchair 10 is locked against movement.

The rotary actuator 30 is also connected to the override handle 62 of the wheelchair 10 via override cable 64 and an override adjustment turnbuckle 66. The override handle 62 is coupled to a handle 70 of the wheelchair 10 by means of clamp assembly 72. The turnbuckle is provided with a cover 66a to provide a pleasing appearance and to hide its functional components.

When the override handle 62 is operated, the override cable 64 will rotate the actuator 30 independently of the cable 60 thereby causing the terminal end 24a of lock pin 24 to become disengaged from the hub 20 as described previously. Thus, the wheel 18 of the wheelchair 10 will be allowed to roll in response to the override handle 62 being actuated to thereby permit a person to move an unoccupied wheelchair as may be desired. Upon release of the override handle 62, the actuator 30 will again be allowed to rotate into its normal condition under the influence of the torsion spring 26 as described previously, thereby once again locking the terminal end 24a of pin 24 with a registered one of the apertures 20a so as to prevent rolling movement of the wheel 18.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A wheelchair locking device which locks a main wheel of the wheel chair against rolling movement comprising:

a locking hub for attachment to the main wheel of the wheelchair;

a locking member including a locking pin establishing an elongate axis and which is reciprocally rectilinearly moveable into and out of engagement with the locking hub in a direction of said elongate axis; and an actuator assembly having a rotary actuator operatively coupled to said locking member and capable of rotary motion about said elongate axis of said locking pin between normal and active conditions, wherein said rotary actuator responsively translates said rotary motion about said elongate axis between said normal and active conditions thereof into reciprocal rectilinear movement of said locking member in the direction a direction of said elongate axis into and out of engagement with said locking hub to thereby lock and unlock said main wheel of the wheelchair, respectively.

2. The device of claim 1, wherein said actuator assembly includes a pivotal actuator lever having one end disposed in close proximity to a seat of the wheelchair and pivotal between raised and lowered conditions relative thereto, and a flexible actuator cable connecting a proximal end of said actuator lever and said rotary actuator, wherein pivotal movement of said distal end of said actuator lever between said raised and lowered conditions responsively causes the actuator cable to rotate the rotary actuator between said normal and active conditions, respectively.

3. The device of claim 1 or 2, wherein the lock hub defines a plurality of circumferentially spaced-apart lock apertures, and wherein the locking member includes a lock pin having a rearward end connected operatively to said rotary actuator and a forward end engageable with a registered one of said lock apertures.

4. A wheelchair locking device which locks a main wheel of the wheel chair against rolling movement comprising:

a locking hub for attachment to the main wheel of the wheelchair;

a locking member reciprocally rectilinearly moveable into and out of engagement with the locking; and an actuator assembly having a rotary actuator operatively coupled to said locking member for responsively translating rotary motion of said rotary actuator between normal and active conditions thereof into reciprocal rectilinear movement of said locking member into and out of engagement with said locking hub to thereby lock and unlock said main wheel of the wheelchair, respectively, wherein the lock hub defines a plurality of circumferentially spaced-apart lock apertures, and wherein the locking member includes a lock pin having a rearward end connected operatively to said rotary actuator and a forward end engageable with a registered one of said lock apertures, and wherein the lock pin includes a torsion spring which encourages the rotary actuator to rotate in a direction from said active condition to said normal condition thereof.

5. A wheelchair locking device which locks a main wheel of the wheel chair against rolling movement comprising:

a locking hub for attachment to the main wheel of the wheelchair;

a locking member reciprocally rectilinearly moveable into and out of engagement with the locking; and an actuator assembly having a rotary actuator operatively coupled to said locking member for responsively translating rotary motion of said rotary actuator between normal and active conditions thereof into reciprocal rectilinear movement of said locking member into and out of engagement with said locking hub to thereby lock and unlock said main wheel of the wheelchair, respectively, wherein said actuator assembly includes a pivotal actuator lever having one end disposed in close proximity to a seat of the wheelchair and pivotal between raised and lowered conditions relative thereto, and a flexible actuator cable connecting a proximal end of said actuator lever and said rotary actuator, wherein pivotal movement of said distal end of said actuator lever between said raised and lowered conditions responsively causes the actuator cable to rotate the rotary actuator between said normal and active conditions, respectively, and wherein said actuator lever includes a spring member which biases said actuator lever into said raised position thereof.

6. A wheelchair locking which locks a main wheel of the wheel chair against rolling movement comprising:

a locking hub for attachment to the main wheel of the wheelchair;

a locking member reciprocally rectilinearly moveable into and out of engagement with the locking; and an actuator assembly having a rotary actuator operatively coupled to said locking member for responsively translating rotary motion of said rotary actuator between normal and active conditions thereof into reciprocal rectilinear movement of said locking member into and out of engagement with said locking hub to thereby lock and unlock said main wheel of the wheelchair, respectively; wherein said rotary actuator includes a rotary cam member having opposed rotary cam lobes, and a stationary cam member having opposed stationary cam lobes which are interdigitated with said rotary cam lobes when said rotary cam member is in said normal condition, wherein rotation of rotary cam member relative to said stationary cam member causes said rotary and stationary cam lobes to engage one another to thereby separate said rotary and stationary cam members from one another.

7. The device of claim 1, 2, 4, 5 or 6, comprising an override handle, and a flexible override cable attached between said override handle and said rotary actuator, wherein said rotary actuator rotates in response to operation of said override handle to thereby move to said active condition thereof and thereby unlock said main wheel of the wheelchair.

8. The device of claim 4 or 6, wherein said actuator assembly includes a pivotal actuator lever having one end disposed in close proximity to a seat of the wheelchair and pivotal between raised and lowered conditions relative thereto, and a flexible actuator cable connecting a proximal end of said actuator lever and said rotary actuator, wherein pivotal movement of said distal end of said actuator lever between said raised and lowered conditions responsively causes the actuator cable to rotate the rotary actuator between said normal and active conditions, respectively.

9. An automatic wheel-locking system for a wheelchair comprising:

a locking hub for attachment to a main wheel of the wheelchair;

a lock pin having an elongate axis and being reciprocally rectilinearly moveable in a direction of said elongate axis between locked and unlocked conditions with said lock hub;

a rotary actuator operatively coaxially coupled to said lock pin and rotatable about said elongate axis thereof between normal and active positions which responsively causes said lock pin to move rectilinearly between said unlocked and locked positions, respectively;

a pivotal actuator lever having one end positionable in close proximity to a seat of the wheelchair and pivotal between raised and lowered conditions relative thereto; and a flexible actuator cable connecting a proximal end of said actuator lever and said rotary actuator, wherein pivotal movement of said distal end of said actuator lever between said raised and lowered conditions responsively causes the actuator cable to rotate the rotary actuator between said normal and active conditions, respectively, whereby said lock pin is caused to move to said locked position and thereby lock the main wheel of the wheelchair.

10. The system of claim 9, wherein the lock hub defines a plurality of circumferentially spaced-apart lock apertures, and wherein the lock pin has a rearward end connected operatively to said rotary actuator and a forward end which is engageable with one of said lock apertures.

11. An automatic wheel-locking system for a wheelchair comprising:

a locking hub for attachment to the main wheel of the wheelchair;

a lock pin which is reciprocally rectilinearly moveable between locked and unlocked conditions with said lock hub;

a rotary actuator operatively coupled to said lock pin and rotatable between normal and active positions which responsively causes said lock pin to move rectilinearly between said unlocked and locked positions, respectively;

a pivotal actuator lever having one end positionable in close proximity to a seat of the wheelchair and pivotal between raised and lowered conditions relative thereto; and a flexible actuator cable connecting a proximal end of said actuator lever and said rotary actuator, wherein pivotal movement of said distal end of said actuator lever between said raised and lowered conditions responsively causes the actuator cable to rotate the rotary actuator between said normal and active conditions, respectively, whereby said lock pin is caused to move to said locked position and thereby lock the main wheel of the wheelchair; wherein the lock pin includes a torsion spring which encourages the rotary actuator to rotate in a direction from said active condition to said normal condition thereof.

12. The system of claim 11, wherein said actuator lever includes a spring member which biases said actuator lever into said raised position thereof.

13. The system of claim 12, wherein said rotary actuator includes a rotary cam member having opposed rotary cam lobes, and a stationary cam member having opposed stationary cam lobes which are interdigitated with said rotary cam lobes when said rotary cam member is in said normal condition, wherein rotation of rotary cam member relative to said stationary cam member causes said rotary and stationary cam lobes to engage one another to thereby separate said rotary and stationary cam members from one another.

14. The system of claim 13 comprising an override handle, and a flexible override cable attached between said override handle and said rotary actuator, wherein said rotary actuator rotates in response to operation of said override handle to thereby move to said active condition thereof and unlock said main wheel of the wheelchair.

15. An automatic wheel-locking system for a wheelchair comprising:

a locking hub for attachment to a main wheel of the wheelchair;

a lock pin which is reciprocally rectilinearly moveable between locked and unlocked conditions with said lock hub;

a rotary actuator operatively coupled to said lock pin and rotatable between normal and active positions which responsively causes said lock pin to move rectilinearly between said unlocked and locked positions, respectively;

a pivotal actuator lever having one end positionable in close proximity to a seat of the wheelchair and pivotal between raised and lowered conditions relative thereto; and a flexible actuator cable connecting a proximal end of said actuator lever and said rotary actuator, wherein pivotal movement of said distal end of said actuator lever between said raised and lowered conditions responsively causes the actuator cable to rotate the rotary actuator between said normal and active conditions, respectively, whereby said lock pin is caused to move to said locked position and thereby lock the main wheel of the wheelchair; wherein said actuator lever includes a spring member which biases said actuator lever into said raised position thereof.

16. An automatic wheel-locking system for a wheelchair comprising:

a locking hub for attachment to a main wheel of the wheelchair;

a lock pin which is reciprocally rectilinearly moveable between locked and unlocked conditions with said lock hub;

a rotary actuator operatively coupled to said lock pin and rotatable between normal and active positions which responsively causes said lock pin to move rectilinearly between said unlocked and locked positions, respectively;

a pivotal actuator lever having one end positionable in close proximity to a seat of the wheelchair and pivotal between raised and lowered conditions relative thereto; and a flexible actuator cable connecting a proximal end of said actuator lever and said rotary actuator, wherein pivotal movement of said distal end of said actuator lever between said raised and lowered conditions responsively causes the actuator cable to rotate the rotary actuator between said normal and active conditions, respectively, whereby said lock pin is caused to move to said locked position and thereby lock the main wheel of the wheelchair; wherein said rotary actuator includes a rotary cam member having opposed rotary cam lobes, and a stationary cam member having opposed stationary cam lobes which are interdigitated with said rotary cam lobes when said rotary cam member is in said normal condition, wherein rotation of rotary cam member relative to said stationary cam member causes said rotary and stationary cam lobes to engage one another to thereby separate said rotary and stationary cam members from one another.

17. An automatic wheel-locking system for a wheelchair comprising:

a locking hub for attachment to a main wheel of the wheelchair;

a lock pin which is reciprocally rectilinearly moveable between locked and unlocked conditions with said lock hub;

a rotary actuator operatively coupled to said lock pin and rotatable between normal and active positions which responsively causes said lock pin to move rectilinearly between said unlocked and locked positions, respectively;

a pivotal actuator lever having one end positionable in close proximity to a seat of the wheelchair and pivotal between raised and lowered conditions relative thereto;

a flexible actuator cable connecting a proximal end of said actuator lever and said rotary actuator, wherein pivotal movement of said distal end of said actuator lever between said raised and lowered conditions responsively causes the actuator cable to rotate the rotary actuator between said normal and active conditions, respectively, whereby said lock pin is caused to move to said locked position and thereby lock the main wheel of the wheelchair;

an override handle, and a flexible override cable attached between said override handle and said rotary actuator, wherein said rotary actuator rotates in response to operation of said override handle to thereby move to said active condition thereof and thereby unlock said main wheel of the wheelchair.

18. The system of claim 9, 15, 16, or 17, wherein the lock hub defines a plurality of circumferentially spaced-apart lock apertures, and wherein the lock pin has a rearward end connected operatively to said rotary actuator and a forward end which is engageable with one of said lock apertures.

* * * * *